(12) United States Patent
Andersson et al.

(10) Patent No.: US 11,066,223 B2
(45) Date of Patent: Jul. 20, 2021

(54) OPENING DEVICE, METHOD FOR MANUFACTURING SUCH OPENING DEVICE AND PACKAGING MATERIAL FOR USE IN SAID METHOD

(71) Applicant: TETRA LAVAL HOLDINGS & FINANCE S.A., Pully (CH)

(72) Inventors: Pär Andersson, Lund (SE); Pär Rydberg, Stehag (SE); Göran Johansson, Lund (SE); Mattias Lennartsson, Lund (SE); Thorbjörn Andersson, Södra (SE); Per Ohlsson, Flyinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 776 days.

(21) Appl. No.: 15/319,692

(22) PCT Filed: Jun. 19, 2014

(86) PCT No.: PCT/EP2014/062961
§ 371 (c)(1),
(2) Date: Dec. 16, 2016

(87) PCT Pub. No.: WO2015/192905
PCT Pub. Date: Dec. 23, 2015

(65) Prior Publication Data
US 2017/0137197 A1  May 18, 2017

(51) Int. Cl.
*B65D 75/66* (2006.01)
*B29C 45/14* (2006.01)
(Continued)

(52) U.S. Cl.
CPC ........ *B65D 75/66* (2013.01); *B29C 45/14065* (2013.01); *B29C 45/14786* (2013.01);
(Continued)

(58) Field of Classification Search
CPC ................................................ B29C 45/14786
See application file for complete search history.

(56) References Cited

U.S. PATENT DOCUMENTS

| 4,230,659 A | 10/1980 | Sutch |
| 4,828,138 A | 5/1989 | Andersson |
| (Continued) | | |

FOREIGN PATENT DOCUMENTS

| DE | 29 21 172 A1 | 12/1979 |
| GB | 2 003 446 A | 3/1979 |
| (Continued) | | |

OTHER PUBLICATIONS

Office Action (Notification of Reasons for Refusal) dated Aug. 6, 2018, by the Japanese Patent Office in corresponding Japanese Patent Application No. 2016-573794, and an English Translation of the Office Action. (4 pages).

(Continued)

*Primary Examiner* — Matthew J Daniels
*Assistant Examiner* — Mohammad M Ameen
(74) *Attorney, Agent, or Firm* — Buchanan Ingersoll & Rooney PC

(57) ABSTRACT

The present invention relates to an opening device comprising a first portion on one side of a fibre based packaging laminate and a second portion on an opposite side of the fibre based packaging laminate, the first and second portion being formed in one and the same piece and joined by at least one material bridge extending through the packaging laminate. The present invention also relates to a method for manufacturing the opening device and to a packaging material to be used is such a method.

5 Claims, 3 Drawing Sheets

(51) Int. Cl.
*B65D 5/70* (2006.01)
*B65D 65/40* (2006.01)
*B29K 711/12* (2006.01)
*B29K 623/00* (2006.01)
*B29K 705/02* (2006.01)
*B29K 105/00* (2006.01)
*B29L 31/00* (2006.01)

(52) U.S. Cl.
CPC .......... *B29C 45/14811* (2013.01); *B65D 5/70* (2013.01); *B65D 65/40* (2013.01); *B29C 2045/14983* (2013.01); *B29K 2105/0067* (2013.01); *B29K 2623/06* (2013.01); *B29K 2623/086* (2013.01); *B29K 2623/12* (2013.01); *B29K 2705/02* (2013.01); *B29K 2711/123* (2013.01); *B29K 2995/0067* (2013.01); *B29L 2031/712* (2013.01)

(56) References Cited

U.S. PATENT DOCUMENTS

2012/0273996 A1\* 11/2012 Martini ............... B29C 45/1418
264/279

2015/0102524 A1\* 4/2015 Hubauer ........... B29C 45/14786
264/257

FOREIGN PATENT DOCUMENTS

| | | | | |
|---|---|---|---|---|
| GB | 2003446 A | \* | 3/1979 | ........... B65D 17/507 |
| JP | S54-157165 A | | 12/1979 | |
| JP | S63-317453 A | | 12/1988 | |
| JP | H07-300151 A | | 11/1995 | |
| RU | 2 270 795 C2 | | 2/2006 | |
| RU | 2010 102 786 A | | 8/2011 | |
| WO | 02/44040 A1 | | 6/2002 | |
| WO | WO 2009/000927 A1 | | 12/2008 | |

OTHER PUBLICATIONS

International Search Report (PCT/ISA/210) dated Jan. 5, 2015, by the European Patent Office as the International Searching Authority for International Application No. PCT/EP2014/062961.
Written Opinion (PCT/ISA/237) dated Jan. 5, 2015, by the European Patent Office as the International Searching Authority for International Application No. PCT/EP2014/062961.
International Preliminary Report on Patentability (PCT/IPEA/409) dated Dec. 20, 2016, by the International Bureau of WIPO for International Application No. PCT/EP2014/062961.

\* cited by examiner

OPENING DEVICE, METHOD FOR MANUFACTURING SUCH OPENING DEVICE AND PACKAGING MATERIAL FOR USE IN SAID METHOD

FIELD OF THE INVENTION

The present invention relates to an opening device and a method for manufacturing said opening device.

TECHNICAL BACKGROUND

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of lamination layers of heat-seal plastic material, e.g. polyethylene films, covering both sides of the base layer. In the case of aseptic packages for long-storage products the packaging material may also comprise a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product. Such layers may also operate as light barriers.

Packages of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube. The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

To open the packages described above, various solutions have been proposed, including reclosable opening devices made of plastic material and substantially comprising a spout, e.g. a tubular construction defining a through opening which is fitted to a hole in a wall of the package, and a removable cap, e.g. screwed or hingedly arranged, fitted to the spout.

In the patent application WO2009000927, by the present applicant, an alternative opening device is presented. In that application a spout and a corresponding membrane is injection molded in the same molding step, directly onto a sheet of packaging material.

There are also other types of packages provided by the present applicant, such as the Tetra Fino Aseptic® (TFA). The TFA package is provided in the form of pillow packs, and the opening device is generally provided in the form of a strawhole, or simply as a cut indicator, which is facilitated by a rather thin and thus tearable packaging material being used. Using the quite complex opening device of the application cited above, or an opening device in accordance with the background art presented in that particular application would in most cases be fully functional. However, the latter type of package is a high-volume (in terms of packages per time unit) and low-cost package (due to the properties of the packaging material), and such opening devices might hamper the production speed and be detrimental for the cost of the package.

For this reason there is a need for an opening device having a high efficiency in regard of the amount of material used and the time needed for production of each opening device. It should be emphasized that even if the present invention was developed to solve a specific problem, the outcome may be applied to packages in a general sense and it should not be limited to a particular type of packages in this respect.

SUMMARY OF THE INVENTION

According to a first aspect of the present invention a method of manufacturing an opening device, comprises the steps of:

arranging a first mold half comprising a first mold cavity on a first side of a fibre based packaging laminate, arranging a second mold half comprising a second mold cavity on an opposing side of the fibre based packaging laminate, wherein the first mold cavity partly overlaps the second mold cavity in one or more overlapping areas and, injecting a melt into at least said first mold cavity, wherein the melt, due to pressure being built up in said cavity, penetrates through the fibre based packaging laminate in an overlapping area and fills also at least said second mold cavity for generation of an opening device extending through the packaging laminate.

The inventive manufacturing method enables a time efficient and material efficient production of opening devices applied to a packaging material. Since the injected melt penetrates the packaging laminate there is no immediate need of arranging the mold halves in register with e.g. a hole pattern on the packaging material, which is the case for prior art opening devices. Often enough the positioning of the opening device has to account for décor printed onto the packaging material or crease lines provided to facilitate the folding of the material, yet the need of positioning the opening device in register with a hole pattern may reduce the tolerances further. This may be avoided using the present invention.

Further, the invention will mechanically connect one side of the packaging material (e.g. the future inside of a packaging container) with the other side (e.g. the future outside of the packaging container). In this way a pulling force applied to the opening device on the outside may be transferred to a pushing force being applied to the packaging laminate from the inside, by the portion of the opening device being arranged on the inside. It is readily understood that the chances of providing a well-defined opening of a packaging laminate are improved by pushing onto all the layers of the laminate from one side instead of applying a pulling force on the top layer alone from the other side. The latter alternative increases the risk of delamination, i.e. that the top layer is released from the adjacent layer.

As the melt penetrates the packaging laminate in the overlapping areas (since there is no counterforce) it may cover thus exposed portions of the packaging laminate. It may also be welded to an inner layer of the laminate. This results in several beneficial features. The inside of a future packaging container will be formed from a continuous layer, which will reduce the risk of leakage (into the container or out of the container). Also, coverage of the exposed portions of e.g. the fibre-based core will reduce the risk of the fibre-based core absorbing moisture, which could jeopardize the integrity of the packaging container.

Even further the inventive method provides the possibility of manufacturing an opening device without any excessive components.

According to one or more embodiments the overlap between the first and second mold cavity may be positioned in accordance to a mark on the fibre based packaging laminate. In the text above it was emphasized that by using the present invention it was not necessary to arrange the mold halves in relation to a hole pattern on or in the packaging material, yet in order to improve the positioning of the mold halves they may still be positioned in accordance with a control mark on the fibre based packaging material.

In one or more embodiments of the present invention injection of the melt is arranged such that penetration of the fibre-based packaging laminate by the melt is directed from the inside of the fibre based packaging laminate towards the outside thereof. The benefits of this mode of operation will be obvious from the detailed description to come. Often enough this ensured by injecting plastic melt into the cavity arranged on the inside of the packaging material only, yet additional injection points may be arranged in the cavity arranged on the outside of the packaging material too, without departing from the present invention.

In one or several embodiments the injected melt is directed directly towards an overlapping area. In this way not only the pressure generated by the injected melt will assist in the penetration of the packaging material, but also the inertia of the injected melt being directed directly onto the overlapping area.

The present invention also relates to an opening device manufactured with the inventive method. Such an opening device comprises a first portion on one side of a fibre based packaging laminate and a second portion on an opposite side of the fibre based packaging laminate, the first and second portion being formed in one and the same piece and joined by at least one material bridge extending through the packaging laminate. This aspect of the present invention enables for a force applied on the first portion to be directly transferred to the second portion. In a practical example this will result in that a pulling force applied on first portion on the outside of the package will be transferred to the second portion which will push on the packaging laminate from the inside. This pushing force will rupture the packaging material without the risk of delamination (separation of the layers combined in the laminate), which has been above.

According to one or more embodiments the opening device may comprise two material bridges, which increases the number of designs possible for the opening device. The use of two material bridges, i.e. two positions in which the material of the opening device will penetrate the packaging material, offers the possibility to obtain functionally complex solutions as well as visually appealing solutions with the straightforward inventive technique.

According to one or several embodiments of the present invention the material bridge and/or adjacent portions thereof may embed exposed edges of the packaging laminate and particularly of the fibre based core thereof to a high degree. While it is critical that no fibres are being exposed on the inside of the packaging container, and while the present embodiment enables prevention of the exposed fibres from absorbing moisture from the outside, and absolute coverage is not critical on the outside of the packaging container, and in any case it will improve visual appearance of the opening device.

In one or more embodiments the first portion is divided into different operational portions, such that it may comprise a tab section and a frame section, both being joined to the second portion via at least one material bridge each. This arrangement provides different operational portions on an outside of the packaging material, without the operational portions having to be directly connected to each other on the outside of the packaging material. This makes it possible to optimize visual appearance without hampering the functionality of the opening device, and vice versa. The tab section may preferably be welded to the outside of the packaging material.

In one or several embodiments an outer peripheral edge of the second portion and an inner peripheral edge of the first portion, in particular an inner edge of a frame portion, at least along a section thereof, extends parallel to each other. This feature may be very important when applying the opening device to a tough packaging material, since cooperation between the different portions will provide a scissor action cutting through the tough material.

In one or several embodiments a distance d between the outer peripheral edge of the second portion and the inner peripheral edge of the frame portion is within the interval 0.1 t-0.75 t, where t is the thickness of the packaging material. By choosing a distance within this interval the force needed to open the opening device may be minimised, and the amount of polymer material used in the opening device can be kept very low. The reasoning behind the interval will be described in the specification in relation to the first embodiment.

In most of the foreseeable embodiments of the present invention the material of the opening device may be weldable to laminated plastic layers of the packaging laminate. This feature improves the adhesion between the opening device and the packaging laminate, which results in several advantages. Starting with the production, the mold may be opened before the plastic has frozen completely. This reduces cycle times and it also reduces the cooling needed for the molding tools used in the process. Opening the mold before the plastic has frozen, however, confers a risk of the opening device being deformed. The increased adhesion will, however, assist in positioning the opening device before the plastic freezes, since a base volume thereof will be securely anchored to the packaging material. Another advantage is that the opening device will effectively weld to the outer layer(s) of the packaging laminate, forming a liquid tight seal. This will ensure a proper seal of the container as such, and it will also ensure that the fibre-based core of the packaging material is encapsulated, which is of particular importance in the opening where the material of the opening device has penetrated the packaging material.

According to another aspect of the present invention it relates to a packaging laminate to be used in the inventive method, or onto which the inventive opening device may be arranged.

In any embodiment the packaging material may comprise a mark, visible or invisible, indicating a correct position for the opening device. This mark may be more important in situations where the position of the material bridge of the opening device (i.e. the position of the overlap between the first and the second mould half should be aligned with a décor or printing.)

Typical materials for the opening device are polyethylene (PE), which may be used when the outer layers of the packaging laminate are made from PE, and polypropylene (PP) when the when the outer layers are made from PP. In cases where the outer layers of the packaging laminate are made from polyethylene terephthalate (PET) the opening device may be made from PET too. It will be obvious from the following detailed description that the present invention, in several embodiments thereof, gains from being made from a material which is weldable to the packaging material onto which it is applied. This is particularly true for the inside of the resulting packaging container, where weldability improves the maintenance of sterility. For the outside, and in specific embodiments, a non-weldable combination may be selected on purpose, e.g. in order to prevent parts (such as the tab section) of the opening device from adhering to the outer layer of the packaging laminate.

BRIEF DESCRIPTION OF THE DRAWINGS

The invention will be described in more detail with reference to the appended schematic drawings, which shows an example of a presently preferred embodiment of the invention.

FIG. 3b is a cross section along the line V-V of FIG. 3a.

DETAILED DESCRIPTION OF A PREFERRED EMBODIMENT

Figure 1:
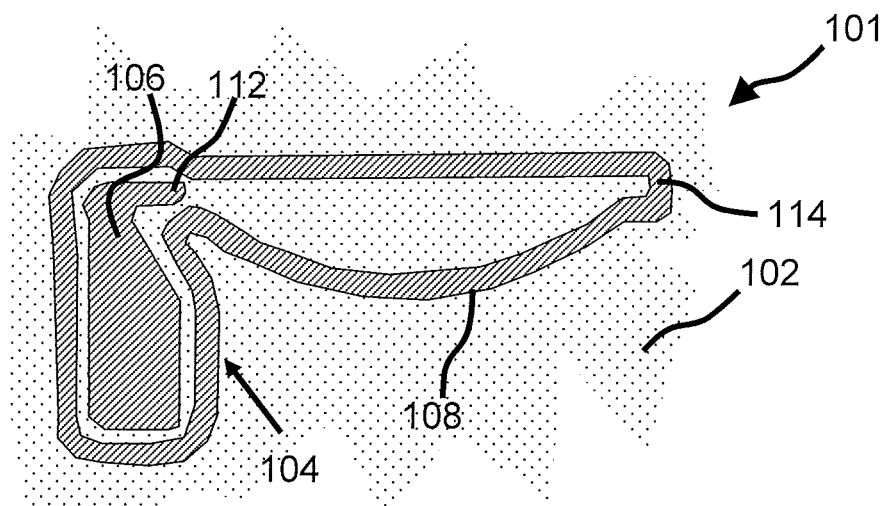
FIG. 1 is a plan view of an opening device according to a first embodiment of the present invention, illustrating the portion of the opening device arranged on an outside of the packaging container.

FIG. 1 illustrates an opening device 101 in accordance with a first embodiment of the present invention. The view shows the opening device 101 in a plan view, as seen from a first side of the packaging container (packaging material 102). For all foreseeable purposes this first side corresponds to an outer side of the packaging container 102 onto which the opening device may be arranged. The packaging container 102 is made of a packaging material laminate. The material has a base layer for stiffness and strength, which comprises a layer of fibrous material, e.g. paper, or mineral-filled polypropylene material; and a number of lamination layers of heat-seal plastic material, e.g. polyethylene films, covering both sides of the base layer. In the case of aseptic packages for long-storage products the packaging material may also comprise a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product. Such layers may also operate as light barriers.

The base layer is a paper having a thickness around 50-200 μm and a weight of around 40-180 gram per m². Thickness can also go up to 400 μm for specific containers.

A first portion 104 of the opening device, the portion visible in FIG. 1, has a tab section 106 and a frame section 108, which at a first glance appears to be formed from separate parts. It will be shown, however, that this does not have to be the case, and for the present embodiment it is certainly not. A user may use the tab section 106 in order to obtain a firm grip of the opening device 101, and a specific function of the frame section 108 is described below. The skilled person realizes that for the material combinations preferably used for the materials of the opening device and an outer layer of the packaging material on which the opening device is arranged, the tab section 106 will adhere and even weld to the outer layer. An advantage of this effect is that there will be no crevices between the tab section and the outer layer, which facilitates sterilization.

Figure 2:
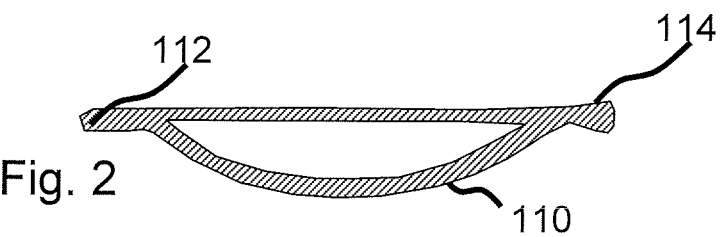
FIG. 2 is a view of the opening device of FIG. 1, illustrating the portion of the opening device arranged on the inside of the packaging container.
Figure 3A:
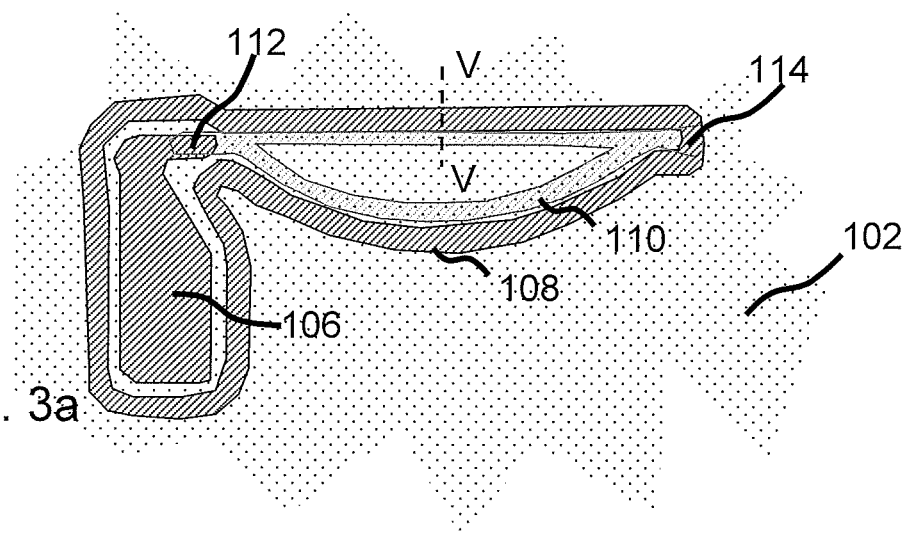
FIG. 3a is a view combining the view of FIG. 1 and FIG. 2.

FIG. 2 illustrates the portion 110 of the opening device arranged on the inside of the packaging material. The view of the portion 110 is not from the inside of the packaging container, but from the same direction as the view of FIG. 1, but with all components but portion 110 removed. The reason is to better illustrate the relationship between the portion arranged on the outside and the portion arranged on the inside, which is even more apparent from the view of FIG. 3.

As the user pulls the tab section 106 the pull force will be transferred to the portion 110 on the inside of the packaging container, via a first material bridge connecting the two portions 103 and 110. The location of the first material bridge is indicated by reference numeral 112. The inside portion 110 will thanks to this arrangement push the superimposed layers of packaging laminate 102 in order to accomplish opening of the packaging container. At the end of the inside portion remote to the first material bridge 112 a second material bridge 114 is arranged, connecting the inside portion 110 and the frame section 108. In practice the frame portion 108 may be manufactured from a separate part, yet forming the entire opening device in one piece may be advantageous. The frame section 108 may not be necessary for all embodiments, yet in the present embodiment an inner perimeter of the frame section 108 will cooperate with an outer perimeter of the inside portion 110 in order to accomplish a scissor action. This scissor action enables and facilitates a clean cut of e.g. any tough polymer layer comprised in the packaging laminate 102. Further, the scissors action facilitates opening in that the force needed from the consumer is lowered, as well as it makes it possible to keep the polymer material needed in the opening device a minimum.

Figure 3B:
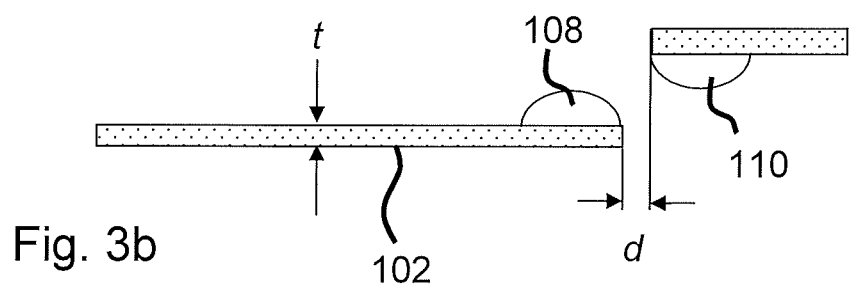
Figure 3C:
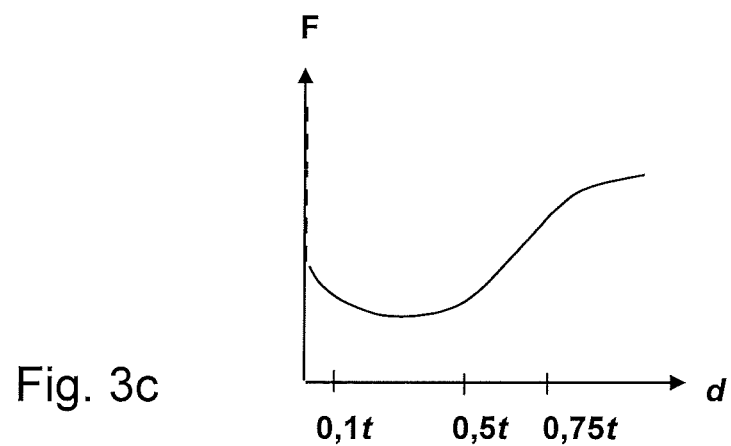
FIG. 3c is a graph over the scissors action.

To provide a highly effective scissors action it is known that the distance d between the "scissors blades", which "scissors blades" in this embodiment are the inside portion 110 and the frame section 108, plays an important role as well as the thickness t of the packaging material to be cut, see FIG. 3b. The graph in FIG. 3c shows the relationship between the opening force F, the distance d between the edges of the inside portion 110 and the frame section 108 and the thickness t of the packaging material. Through simulations it has been found that, at a distance d=0 between the edges of the inside portion 110 and the frame section 108, the packaging material is exerted to a high compression force during opening. No shearing forces are present acting perpendicular to the packaging material. The result is that the opening device cannot be opened easily. The force F that the consumer needs to overcome is considered too high.

Further, a distance d=0.75 t, which means a distance being 75% of the packaging material thickness, is the lower limit used in the crease tools when making crease lines in the packaging material. The force F is here also considered to be high for a consumer, but not too high if the base layer of paper in the packaging material is thin (paper thickness less than about 200 μm). The reason that the distance d is chosen to be at least 0.75 t when creasing packaging material is that cracks in the surface layers may be avoided. At distances d below 0.75 t cracks will easily arise, first in the surface layers and then sequentially in the rest of the layers.

Hence, an ideal distance d, giving a minimum force F for the consumer to overcome, has been found to be within the interval 0.1 t-0.75 t, preferably 0.1 t-0.5 t. In these intervals the packaging material will fail due to shearing, i.e. when the material starts breaking merely shearing forces are present. The reason for the low forces needed is as well, as mentioned above, that the layers of the packaging material are here substantially sequentially cracking and breaking.

If the distance d increases to a value of more than 50% of the thickness t of the packaging material (d>0.5 t), the force F which the consumer has to overcome will start to increase rapidly.

At a distance d larger than t (t>d), the force F during breakage will be a mere tension force in the plane of the packaging material. Such may normally only be overcome by a consumer if the base layer of paper in the packaging material is thin (paper thickness less than about 200 μm).

By letting the distance d stay within the interval of 0.1 t-0.75 t the force needed for opening is minimised, and that in turn makes it possible to use a weaker opening device, i.e. the amount of polymer material needed may be kept very low. In this embodiment the amount is as low as a few grams.

It should however be pointed out that the present invention is not limited to a distance d=0.1 t-0.75 t. If the opening device is applied on a thin packaging material, e.g. if the base layer of paper in the packaging material is thin (paper thickness less than about 200 μm), the openability will still be satisfactory for distances d above 0.75 t. However, in order to withstand the higher force F, the opening device may have to be made of more polymer material.

Further, to increase the efficiency of the scissors action the opening device should preferably be shaped with sharp edges towards the packaging material. The material of the opening device is also a parameter. The scissors action may be "sharpened" by choosing material having a high crystallinity or a material being under its glass transition temperature $T_g$. Examples of materials can be found in the group of polyamides, polypropylenes, polystyrenes, polyesters, liquid crystal polymers, polyethylenes (linear low density polyethylene, low density polyethylene, high density polyethylene).

The portion of the frame section 108 which is not contributing to the scissor action, i.e. the portion of the frame section 108 radially outside of the tab section 106, generally does not contribute to the function of the opening device 101 in relation to the act of opening, yet it may serve a purpose of protecting the tab section 106 from being inadvertently actuated. Also it may ensure that delamination of the outermost plastic layer, which may occur during opening, is confined within the constraints of the frame section 108. It may also contribute to the visual appearance of the opening device 101, and facilitate for a user to grasp the function of the opening device.

Figure 4:
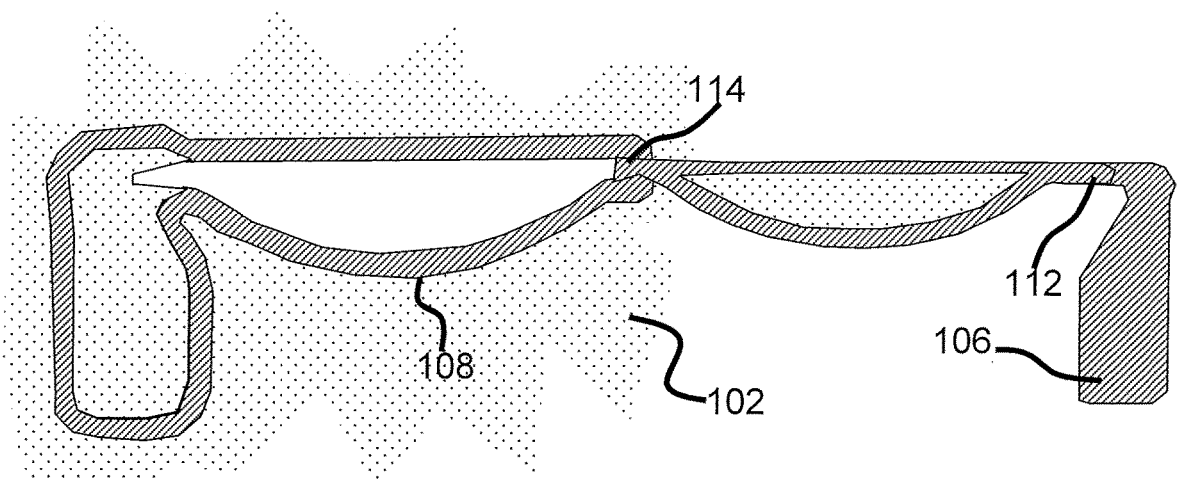
FIG. 4 is a plan view of the opening device shown in FIGS. 1-3a-c after it has been opened.

FIG. 4 illustrates the opening device 101 in an opened state. The user has lifted the tab section and pulled it upwards (away from the packaging laminate) and to the right, thus accomplishing opening of the packaging container. At this point the user may continue pulling, remove and dispose of the loose part of the opening device. The user may also use the partially loosened section in order to partially reclose the opening. In cases where removal of the tab section and the associated opened portion of the opening device is not desired, the opening device may be reinforced at the "hinged" end of the first portion, remote to the tab section, which may be affected in accordance with the embodiment illustrated in FIG. 4 where the hinged end is connected to an inside of the packaging container, thus providing an anchor function. For the present embodiment full liquid tight closure is not to be expected in the reclosed state, yet within the scope of the present invention reclosable opening devices may be designed.

The opening device may be manufactured using two mold cavities only. A first mold half has a mold cavity shaped as the first portion of the opening device, and a second mold half has a mold cavity shaped as the second portion of the opening device. The mold halves are arranged in register on opposite sides of a packaging laminate, and a melt is injected in at least one position into the second mold cavity. The melt will rapidly fill the mold cavity and in places where the first and second mold cavity overlaps, the lack of support will cause the packaging material to rupture such that the melt may fill the second mold cavity too, thus completing the manufacture of the opening device. If desired, or needed for a specific design, more than two mold cavities may be used.

During the injection process the flow rate will be essentially constant and the amount of plastic being injected will correspond to the volume of the mold cavity. The pressure in the melt, however, will vary significantly during the short injection process. Before the cavity into which the melt is injected is filled, there will be no significant pressure increase. When the said cavity has been filled there will be a rapid pressure build-up until the rupture of the packaging material. The pressure will peak moments before the rupture, and the rate at which it is reduced will depend on e.g. the dimensions of the opening generated. It is reasonable to state that if the injection flow rate is high the rupture will be more violent than if the injection flow rate is lower, and that the higher flow rate will result in a larger opening. A larger opening may result in that the full mold cavity is filled more rapidly, which may be beneficial. The optimum flow rate may vary with design of the opening device, properties of the packaging material, properties of the plastic used, etc. yet in a presently operational embodiment the cycle time is less than about 300 ms, i.e., about three opening devices per second may be manufactured by a single mold using the inventive technique.

The dimensions of the opening device may be optimized to achieve an adequate opening of the packaging container only and any surplus use of material may be avoided. In this way only a relatively small amount of plastic is needed (compared to known opening devices). This as the beneficial effect that the time needed for injection is small, yet it also has the effect that the mold does not have to be closed for very long since the plastic will start to freeze (or solidify) immediately. The small amount of plastic vouches for that even if only a surface layer has started to freeze, this will be enough to retain the shape of the opening device until it has fully frozen, which in turn implies that the mold will be opened basically as soon as the injection is finalized. An outermost skin layer of the plastic melt will freeze as soon as it contacts the walls of a mold cavity, or the outermost layer of the packaging material. For non-complex designs this vouches for that the mold may be opened as soon as it is filled. For more complex designs, e.g. designs incorporating steep edges or distinct ridges more time may have to be allocated for the plastic to freeze, such that the plastic is allowed to solidify from the skin and inwards before opening the mold. In this context it should be understood that the plastic will shrink (from the outside and inwards) as it freezes, and in a conventional injection molding process it is known to continue to inject plastic during the freezing, such that the finished detail is an exact replica of the mold cavity. It may also be important to realize that the longer the mold remains closed, the more heat will be transferred from the melt to the mold. This results in a need for installing a cooling arrangement, such as channels for leading cooling fluid through the mold halves. For the present invention such arrangements may not be necessary due to the inherently low cycle times.

The area in which the rupture of the packaging material occurs is not pre-treated in any way. "Pre-treated" in this context meaning perforated, creased or weakened in any other way. The absence of a weakening is an advantage since it increases the tolerances acceptable when arranging the mold halves in register with the packaging material, since no alignment with a weakening has to be performed. A result from the absence of the weakening may be that the unguided rupture of the packaging laminate may generate an uneven edge of the thus formed opening. In such a situation there is an advantage in injection of the melt into the second mold cavity. The advantage is that opening and any resulting projection edge section will be directed outwards, such that the fibre based core material is prevented from being exposed on the inside of the packaging container. Also, as the opening is funnel shaped there is ample surface area on the inside of the packaging material where the plastic of the opening device may adhere or weld to the innermost laminate layer of the packaging material. In this way the risk of contamination of the inside of the packaging container is minimized. An additional effect of an inventive method and thus a feature of the inventive device may be found on the outside of the packaging material. This effect is that the exposed edge of the fibre based core will be caught inside the mold cavity and thus it may be covered by molten material during the injection process. This will eliminate or alleviate the risk of the fibre-based core absorbing moisture and it also improves the visual appearance since the uneven edges may be hidden inside the plastic of the opening device.

Further embodiments may provide a solution where more than two mold parts are used, and where injection of melt is performed in two or more of the mold parts.

In the sections of the opening device where there is no overlap between the mold cavities the opening device will adhere to the surface layer of the packaging laminate. If the temperature and chemical composition allows for it, it may weld to the surface layer, and in other instance it may adhere by a weaker bonding effect. The bond between the packaging laminate will thus generally not be stronger than the adhesive force between the surface layer of the packaging laminate and any adjacent layers. This may be a problem for an opening device relying on this adhesion only, since delamination may result in that the packaging material is not fully penetrated during opening. Since the present invention provides a direct mechanical connection in the form of the first material bridge the pulling force will instead be transformed to a pushing force, enabling reliable opening of a packaging container.

Figure 5:
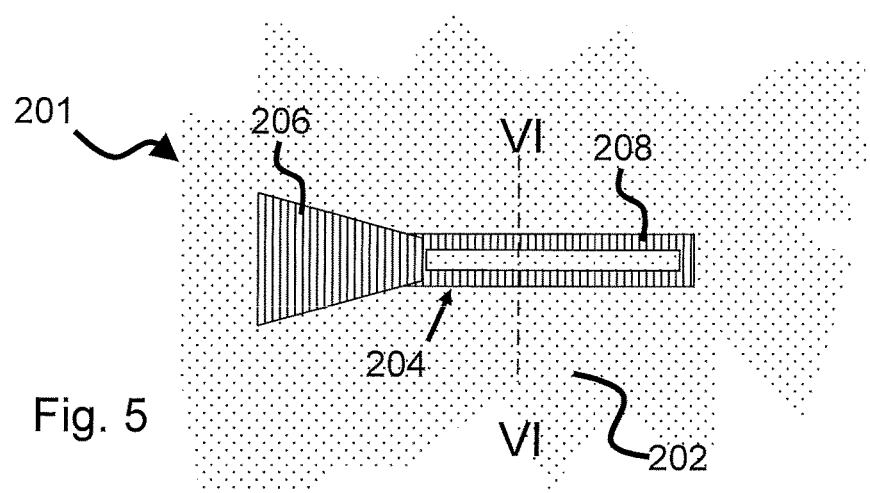
FIG. 5 is a plan view of an opening device in accordance with a second embodiment of the present invention.
Figure 6:
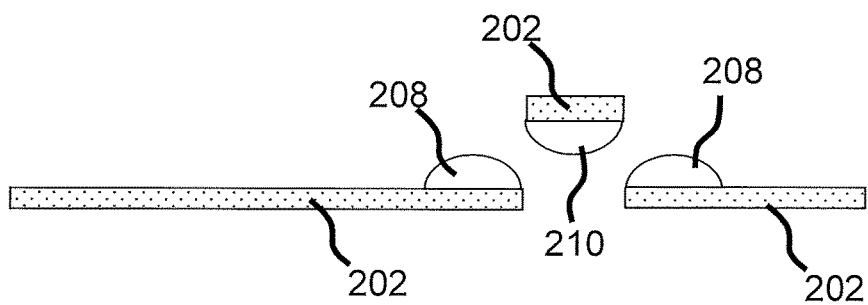
FIG. 6 is a cross section along the line VI-VI of FIG. 5.

FIGS. 5 and 6 show an opening device 201 in accordance with a second embodiment of the present invention. Having described the first embodiment in some detail the second embodiment needs less description. The opening device of the second embodiment is less complex than the first in that opening is effected by a pull-strip function. By pulling a tab 206 of the first portion 204 the second portion 210 will penetrate the packaging material 202 in a zipper-like fashion. Again, the first portion 204 may comprise a frame section 208 that may be arranged to accomplish a scissor action together with the second portion 210 like the one described in accordance with the first embodiment. However, opening device 201 may be made without the frame 208 if one would like to manufacture a very simple opening device where one would not take advantage of the scissors action. In thin packaging material it may function very well, and such opening device can be manufactured using a very small amount of polymer material, for instance less than 0.5 gram. Such may be realized by for example making the second portion 210 short and the pull-tab 206 small. When opening the opening device only a small hole, such as straw hole or a small pouring hole, will be made in the package. For a consumer the only visible part of such opening device will be the pull-tab 206.

Though there is no drawing of a mold or mold cavity the skilled person realizes that the shape of the mold cavity will correlate to the shape of the manufactured opening device (or rather—vice versa), and since the present invention is not directed to the shaping of mold cavities this will not be described any further. Also, injection molding is a well-established technique not the least for some of the suggested materials: PE, PP and PET. Therefore a disclosure of an injection molding process or features thereof is not considered essential for the skilled person to apply the present invention, and it is therefore omitted.

The invention claimed is:

1. A method of manufacturing an opening device, comprising:
    arranging a first mold half comprising a first mold cavity on a first side of a fibre based packaging laminate,
    arranging a second mold half comprising a second mold cavity having a continuous channel on an opposing side of the fibre based packaging laminate,
    wherein the first mold cavity partly overlaps the second mold cavity in one or more overlapping areas, and
    injecting a melt into at least said first mold cavity, wherein the melt, due to pressure being built up in said cavity, penetrates through a part of the fibre based packaging laminate that is not weakened in any way in an overlapping area and fills also at least said second mold cavity for generation of an opening device extending through the packaging laminate,
    wherein, a first portion on one side of a fibre based packaging laminate and a second portion on an opposite side of the fibre based packaging laminate, the first and second portion being formed in one and the same piece and joined by at least one material bridge extending through the packaging laminate.

2. Method according to claim 1, wherein the overlap between the first and second mold cavity is positioned in accordance to a mark on the fibre based packaging laminate.

3. The method of claim 1, wherein
    the first side of the fibre-based packaging laminate is to face that an interior of a package formed from the packaging laminate and the opposing side of the fibre-based packaging laminate is to face an exterior of the package formed from the packaging laminate, and the injecting of the melt is arranged such that penetration of the fibre-based packaging laminate by the melt is directed from the first side of the fibre based packaging laminate towards the opposing side of the fibre-based packaging laminate.

4. The method of claim 3, wherein melt is injected into the first mold cavity arranged on the first side of the fibre-based packaging material.

5. The method of claim 1, wherein the injected melt is directed directly towards one of the overlapping areas.

* * * * *